US010091372B2

(12) United States Patent
Shiota

(10) Patent No.: US 10,091,372 B2
(45) Date of Patent: Oct. 2, 2018

(54) MEDIUM FEEDING DEVICE AND IMAGE READING APPARATUS

(71) Applicant: SEIKO EPSON CORPORATION, Tokyo (JP)

(72) Inventor: Takayuki Shiota, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/460,399

(22) Filed: Mar. 16, 2017

(65) Prior Publication Data
US 2017/0279991 A1    Sep. 28, 2017

(30) Foreign Application Priority Data

Mar. 22, 2016 (JP) ................................. 2016-057051

(51) Int. Cl.
*B65H 3/06* (2006.01)
*H04N 1/00* (2006.01)
*B65H 5/06* (2006.01)

(52) U.S. Cl.
CPC .......... *H04N 1/00551* (2013.01); *B65H 3/06* (2013.01); *B65H 5/06* (2013.01); *H04N 1/00588* (2013.01); *H04N 1/00602* (2013.01); *H04N 1/00628* (2013.01); *B65H 2301/42324* (2013.01); *B65H 2301/44324* (2013.01); *B65H 2801/39* (2013.01); *H04N 2201/0081* (2013.01)

(58) Field of Classification Search
CPC ...... B65H 3/06; B65H 3/5215; B65H 3/5261; B65H 3/66; B65H 5/06; H04N 1/00551; H04N 1/00588; H04N 1/00602; H04N 1/00628; H04N 2201/0081
USPC .............................. 271/10.11, 122, 126, 121
See application file for complete search history.

(56) References Cited

U.S. PATENT DOCUMENTS

| 2003/0160379 | A1* | 8/2003 | Shimamura | B65H 3/06 271/10.01 |
| 2014/0077440 | A1* | 3/2014 | Umi | B65H 3/0661 271/109 |
| 2014/0077449 | A1 | 3/2014 | Umi et al. | |
| 2015/0203309 | A1* | 7/2015 | Hamada | G03G 15/602 271/3.24 |

FOREIGN PATENT DOCUMENTS

| JP | 2010-030772 A | 2/2010 |
| JP | 2012-166926 A | 9/2012 |
| JP | 2014-060494 A | 4/2014 |

* cited by examiner

*Primary Examiner* — David H Bollinger
(74) *Attorney, Agent, or Firm* — Workman Nydegger

(57) ABSTRACT

A medium feeding device includes a lower portion unit in which a feeding roller is provided, and an upper portion unit in which a separating roller is provided and which is connected to the lower portion unit so as to be openable and closable. The lower portion unit has a cover member which covers a holding portion of the feeding roller while exposing a portion of the feeding roller to the transport path, and the cover member is configured to be removable in a direction including a component directed toward an upstream side in the transport direction by being attachable to and detachable from the lower portion unit.

7 Claims, 17 Drawing Sheets

MEDIUM FEEDING DEVICE AND IMAGE READING APPARATUS

BACKGROUND

1. Technical Field

The present invention relates to a medium feeding device which feeds a medium and an image reading apparatus which includes the medium feeding device.

2. Related Art

There is a case where a scanner which is an example of an image reading apparatus includes an automatic document feeder (also referred to as an auto document feeder (ADF)) as a medium feeding device and thus is configured to automatically feed and read a plurality of documents.

The medium feeding device includes a feeding roller which feeds a medium and a separating roller which nips and separates the medium between the feeding roller and the separating roller.

In a case where such a scanner is continuously used, replacement or cleaning of the feeding roller and the separating roller may be performed due to abrasion of each roller surface and adhesion of paper dust generated from a medium to be fed.

For example, JP-A-2014-60494 discloses an image forming apparatus (scanner) which includes a sheet transport device as the medium feeding device and can exchange the feeding roller and the separating roller of the sheet transport device.

In JP-A-2014-60494, the housing including the scanner is divided into an upper portion unit (cover portion 11b) and a lower portion unit (main body portion 11a), and in a case where maintenance of the medium feeding device or clearing of a paper jam is performed, the upper portion unit is configured to be openable and closable with respect to the lower portion unit.

There is a case where the feeding roller or the separating roller includes a roller cover which exposes a portion of the roller and constitutes a portion of a transport path of the medium.

For example, in FIG. 5 of Japanese Patent No. 5663340, a roller cover which exposes a portion of a paper feeding roller 121 (the reference numeral is not illustrated in FIG. 5 of Japanese Patent No. 5663340, see FIG. 2), constitutes the transport path of the medium and is formed flush with a lower side guide 107a is disclosed.

In addition, in FIG. 9 of JP-A-2010-30772, a medium reading apparatus in which the roller cover 15 is also provided for a retard roller 7 as the separating roller is disclosed.

In JP-A-2010-30772, the roller cover 15 is rotatably supported about a point shaft 151 as a point with respect to an upper portion guide 18 on which the retard roller 7 is provided.

In a case where replacement or maintenance of the retard roller 7 is performed, the roller cover 15 is in an open state.

In a configuration in which the upper portion unit opens and closes with respect to the lower portion unit, in a case where the roller cover for the feeding roller is provided so as to open and close by rotating with respect to the lower portion unit on which with the feeding roller is provided, since a hinge portion of the roller cover may be damaged if the upper portion unit is closed in a state in which the roller cover is open, it is necessary for an opening angle of the roller cover to be an angle (for example, an acute angle) in which the roller cover naturally closes even if the upper portion unit is erroneously closed in a state in which the roller cover is open.

If the opening angle of the roller cover is narrow, maintenance work such as replacement or cleaning of the roller becomes difficult.

In addition, in the case where the roller cover is provided to not only the feeding roller but also the separating roller, it is necessary to prevent mutual interference in a case where the respective roller cover is opened at the same time and thus the opening angle of the roller cover is further narrowed.

Further, when the upper portion unit is erroneously closed in a case where the roller covers of both the feeding roller and the separating roller are in the open state, the roller cover and the upper portion unit or the lower portion unit to which the roller cover is attached may be damaged as a result of the two roller covers being in contact with each other. In addition, since the roller cover constitutes a medium transport surface, the transport surface may be scratched.

SUMMARY

An advantage of some aspects of the invention is that a large work space is secured in a case where maintenance of the feeding roller is performed, and the risk of breakage or scratching of the roller cover and surrounding components thereof is reduced.

According to a first aspect of the invention, there is provided a medium feeding device including a lower portion unit in which a feeding roller for feeding a medium is provided, and an upper portion unit in which a separating roller for nipping and separating the medium between the feeding roller and the separating roller is provided. The upper portion unit is connected to the lower portion unit so as to be openable and closable, in a closed state of the upper portion unit, a transport path of the medium is formed by a lower surface of the upper portion unit and an upper surface of the lower portion unit, the lower portion unit has a cover member which covers a holding portion of the feeding roller while exposing a portion of the feeding roller to the transport path, and the cover member is configured to be removable in a direction including a component directed toward an upstream side in the transport direction by being attachable to and detachable from the lower portion unit.

According to the aspect, since the cover member which covers the holding portion of the feeding roller is configured to be attachable to and detachable from the lower portion unit, the cover member can be completely removed from the lower portion unit in a case where maintenance such as replacement or cleaning of the feeding roller is performed and thus the work space for the maintenance can be made large.

In addition, since the cover member is removed from the lower portion unit, the risk of another constituent member (upper portion unit or the like) being in contact with the cover member and scratching the transport surface of the medium during the maintenance can be reduced.

In a case where the cover member is removed, since the cover member can be removed in a direction including a component directed toward the upstream side in the transport direction, the risk of the hand of a user performing the work being in contact with a constituent member which is positioned on a downstream side of the feeding roller and the upper portion unit in an open state can be reduced. Therefore, the risk of breakage or scratching of these portions can be avoided.

In the medium feeding device according to a second aspect of the invention, according to the first aspect, the lower portion unit may include a slide surface which is formed on an inclined surface which rises from the downstream side to the upstream side in the transport direction of the medium and the cover member may be attached and detached by a slide portion which is provided on a downstream side end portion of the cover member being guided by the slide surface.

According to the aspect, the user can easily performs the attachment and detachment of the cover member since the cover member is attached and detached by the slide portion which is provided on the downstream side end portion of the cover member being guided by the slide surface provided on the lower portion unit.

The medium feeding device according to a third aspect of the invention, according to the second aspect, may further include a cover surface constituting a portion of the upper surface of the lower portion unit. The cover member may rotate about the downstream side end portion as a shaft, and the cover member may is in a first position in which the cover surface forms the upper surface of the lower portion unit and thus is attached to the lower portion unit and a second position in which the cover surface is rotated from the first position, and the slide portion is guided by the slide surface and thus the cover member is attachable to and detachable from the lower portion unit.

According to the aspect, in a case where the cover member is removed from the lower portion unit, the cover member rotates from the first position of the cover member being attached to the lower portion unit to the second position and thus the cover member can be removed by the slide portion being guided by the slide surface at the second position. In addition, in a case where the cover member is attached to the lower portion unit, the cover member can be attached to the lower portion unit by an operation which is reverse to at the time of removing thereof. Therefore, the user can attach and detach the cover member by a more natural operation.

In the medium feeding device according to a fourth aspect of the invention, according to the third aspect, the lower portion unit may include a positioning portion which receives the slide portion and which determines an attachment position of the cover member, in a case where the cover member is in the first position.

According to the aspect, the attachment position of the cover member can be easily positioned.

In the medium feeding device according to a fifth aspect of the invention, according to the first aspect, the cover member may include an engaging portion which is engaged to an engaged portion which is provided on the lower portion in a state in which the cover member is attached.

According to the aspect, since the engaging portion of the cover member is engaged to the engaged portion of the lower portion unit in a state in which the cover member has been attached, the cover member which is attached to the lower portion unit is difficult to be removed.

In the medium feeding device according to a sixth aspect of the invention, according to the first aspect, the cover member may include a gripping portion for attaching and detaching the cover member in an upstream side end portion in the transport direction of the medium.

According to the aspect, since the cover member includes the gripping portion for attaching and detaching the cover member in the upstream side end portion in the transport direction of the medium, the cover member can be easily attached and detached.

According to a seventh aspect of the invention, there is provided an image reading apparatus including a reading portion which reads a medium; and the medium feeding device according to the first aspect which feeds the medium toward the reading portion.

According to the aspect, in the image reading apparatus including the reading portion that reads the medium, in a case where the medium is fed toward the reading portion, the same effect as those of any of the first aspect to the sixth aspect is obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

First, an overview of an image reading apparatus which includes a medium feeding device according to a first embodiment of the invention will be described. In this embodiment, a document scanner (hereinafter, simply referred to as a scanner 1) which is capable of reading at least one of a front surface and a rear surface of a medium is given as an example of the image reading apparatus.

Figure 1:
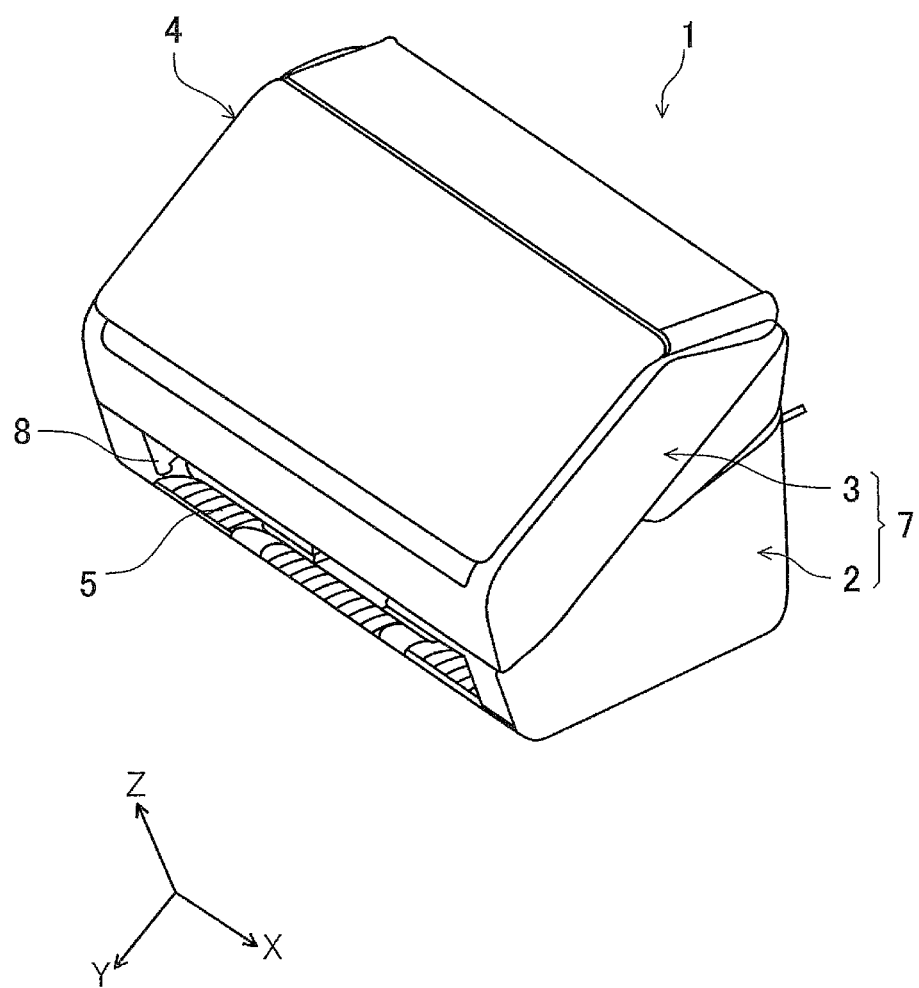
FIG. 1 is a perspective view illustrating an outer appearance of a scanner according to the invention.
Figure 2:
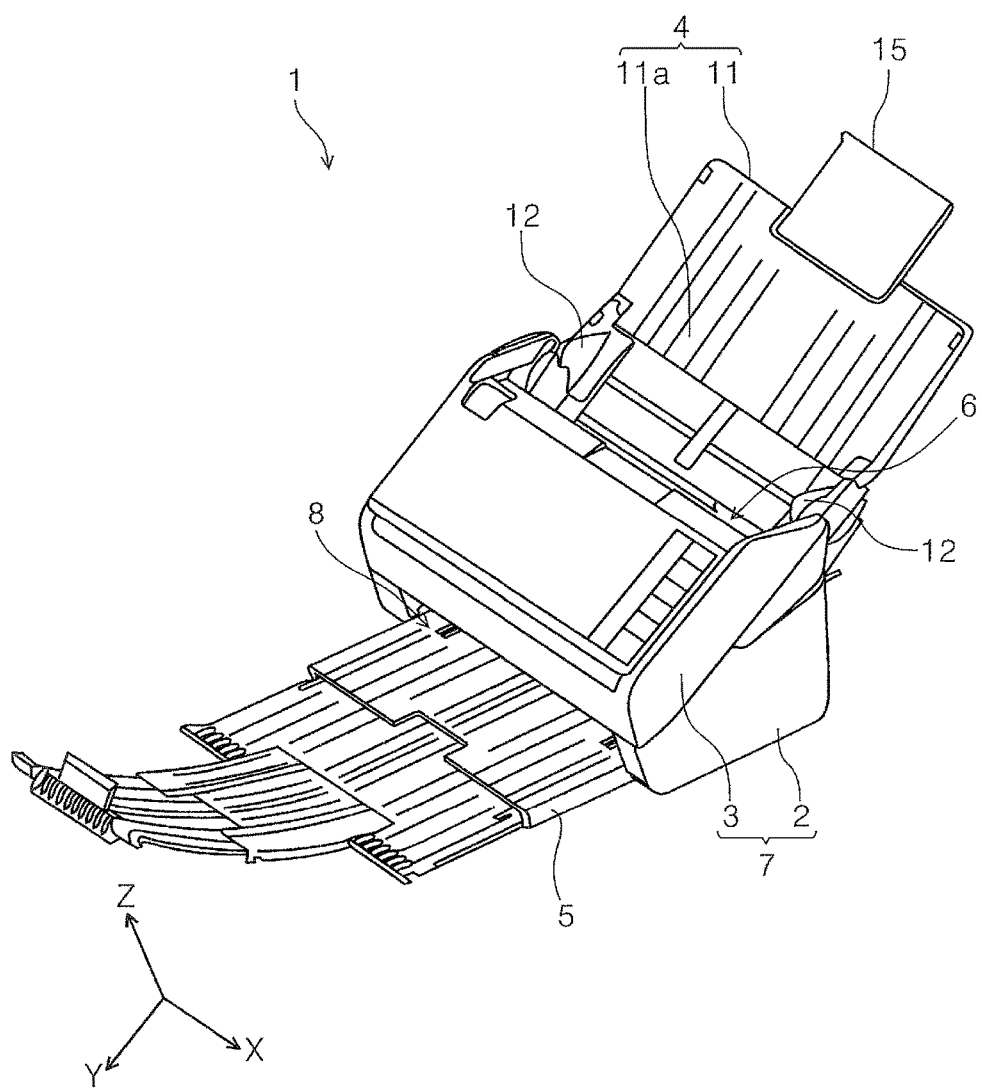
FIG. 2 is a perspective view illustrating a state in which a paper discharge tray has been pulled out in a case where an opening/closing body is open in the scanner according to the invention.
Figure 3:
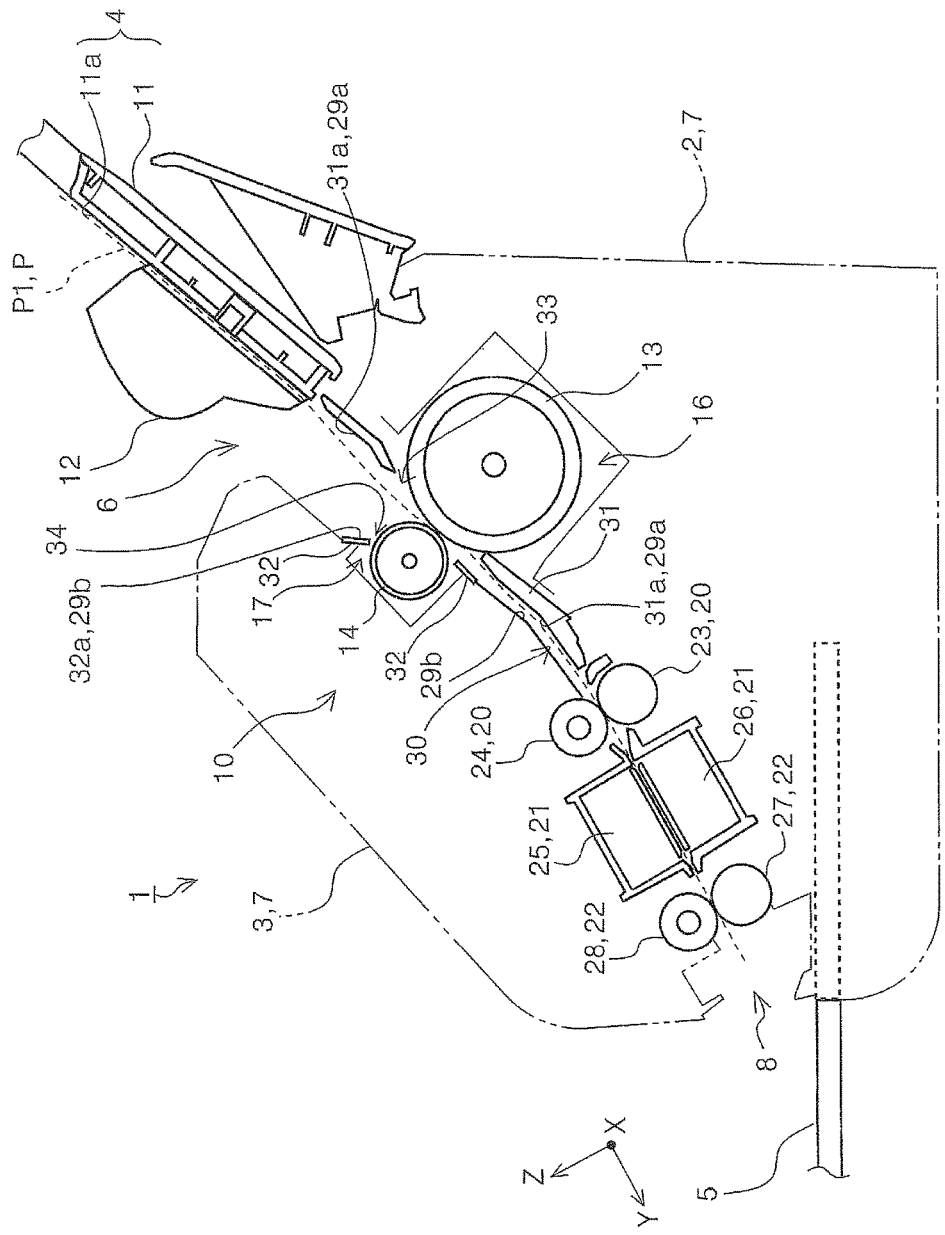
FIG. 3 is a side sectional view illustrating a paper transport path in the scanner according to the invention.
Figure 4:
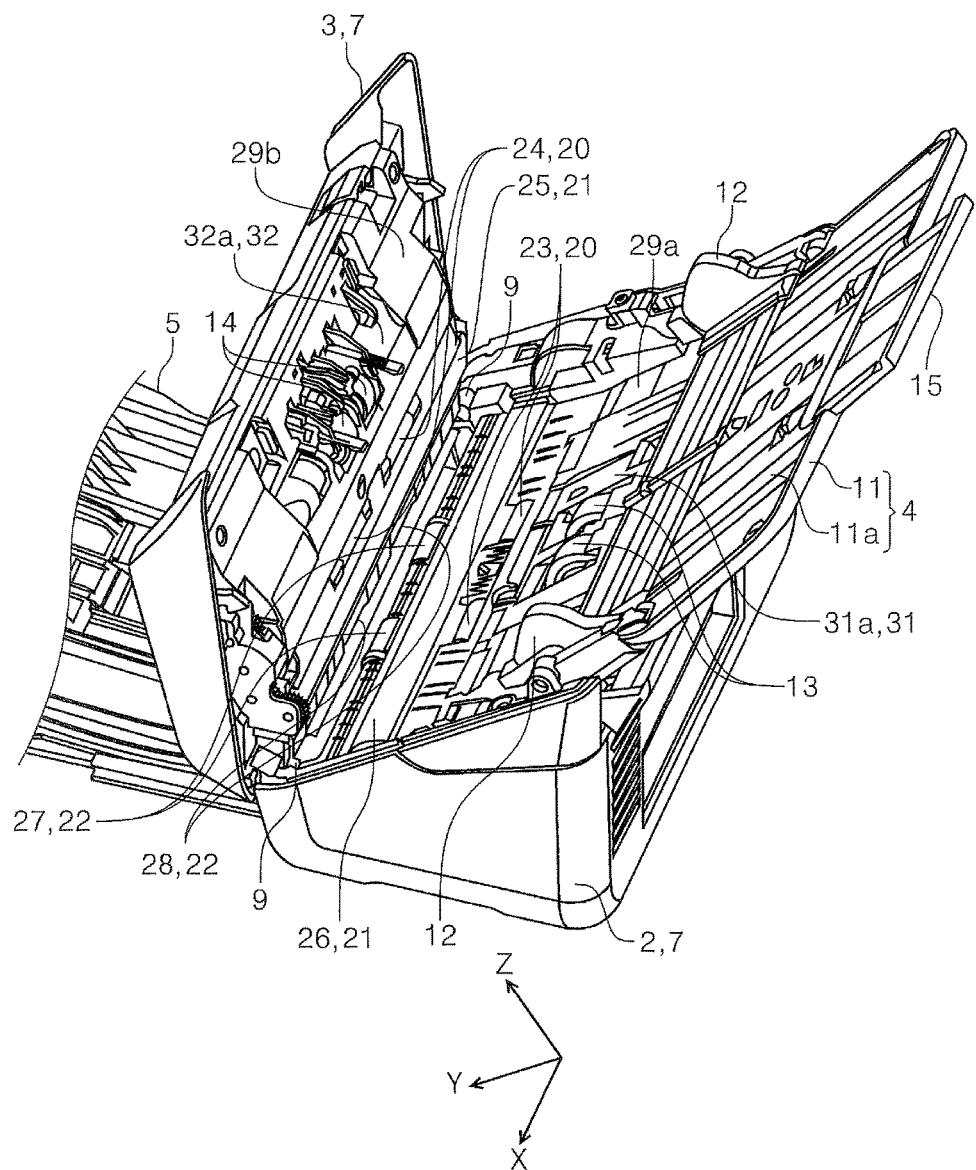
FIG. 4 is a perspective view illustrating a case where an upper portion unit is open with respect to a lower portion unit in the scanner according to the invention.
Figure 5:
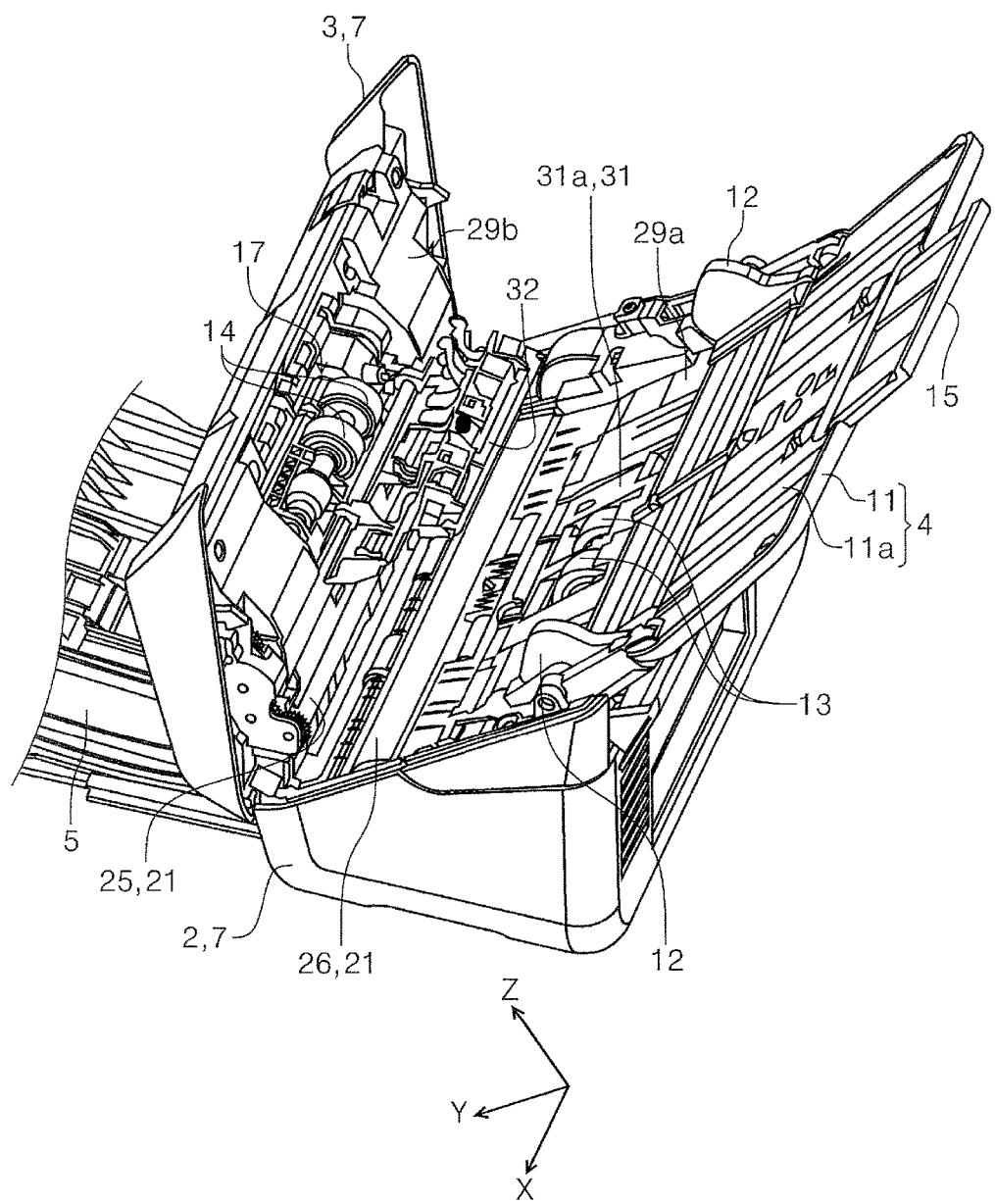
FIG. 5 is a perspective view illustrating a state in which a second cover member is open in the scanner illustrated in FIG. 4.
Figure 6:
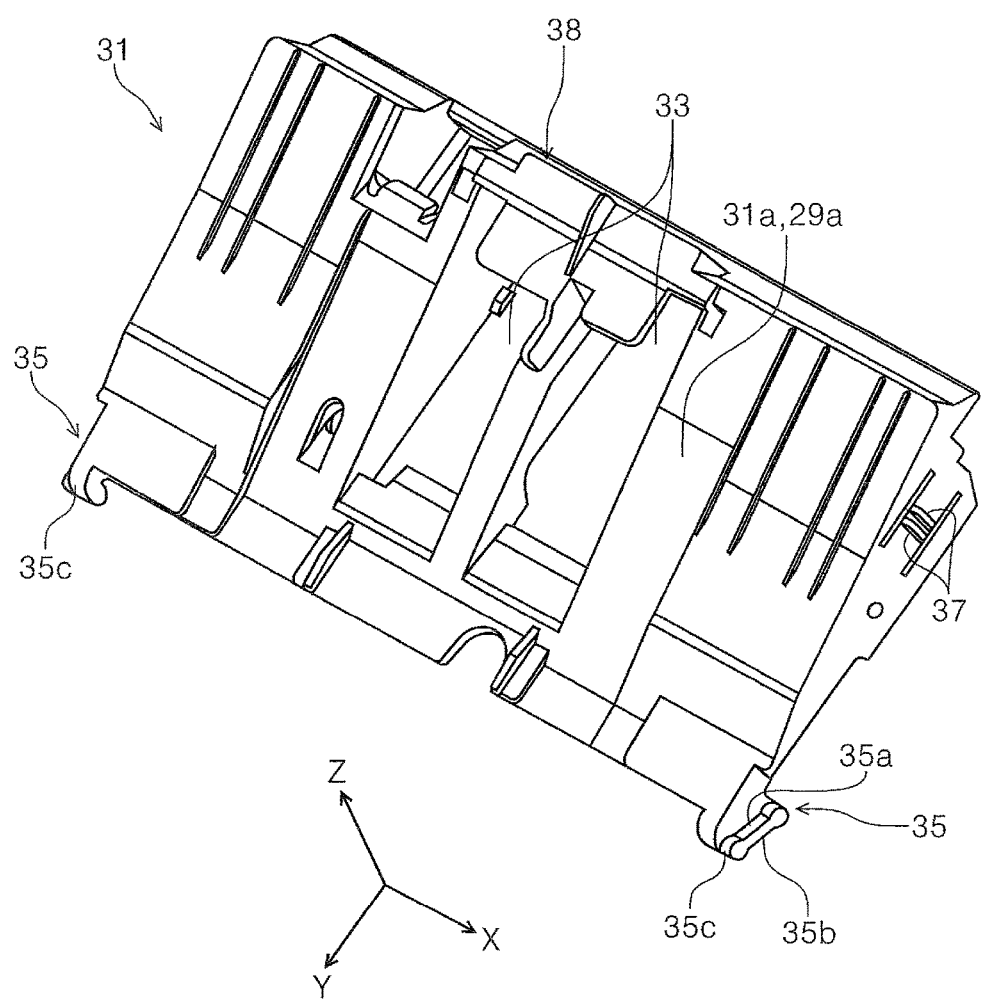
FIG. 6 is a perspective view illustrating a first cover member.

FIG. 1 is a perspective view illustrating an outer appearance of a scanner according to the invention. FIG. 2 is a perspective view illustrating a state in which a paper discharge tray is pulled out when an opening/closing body is open in the scanner according to the invention. FIG. 3 is a side sectional view illustrating a paper transport path in the scanner according to the invention. FIG. 4 is a perspective view illustrating a case where an upper portion unit is open with respect to a lower portion unit in the scanner according to the invention. FIG. 5 is a perspective view illustrating a state in which a second cover member is open in the scanner illustrated in FIG. 4. FIG. 6 is a perspective view illustrating a first cover member.

Figure 7:
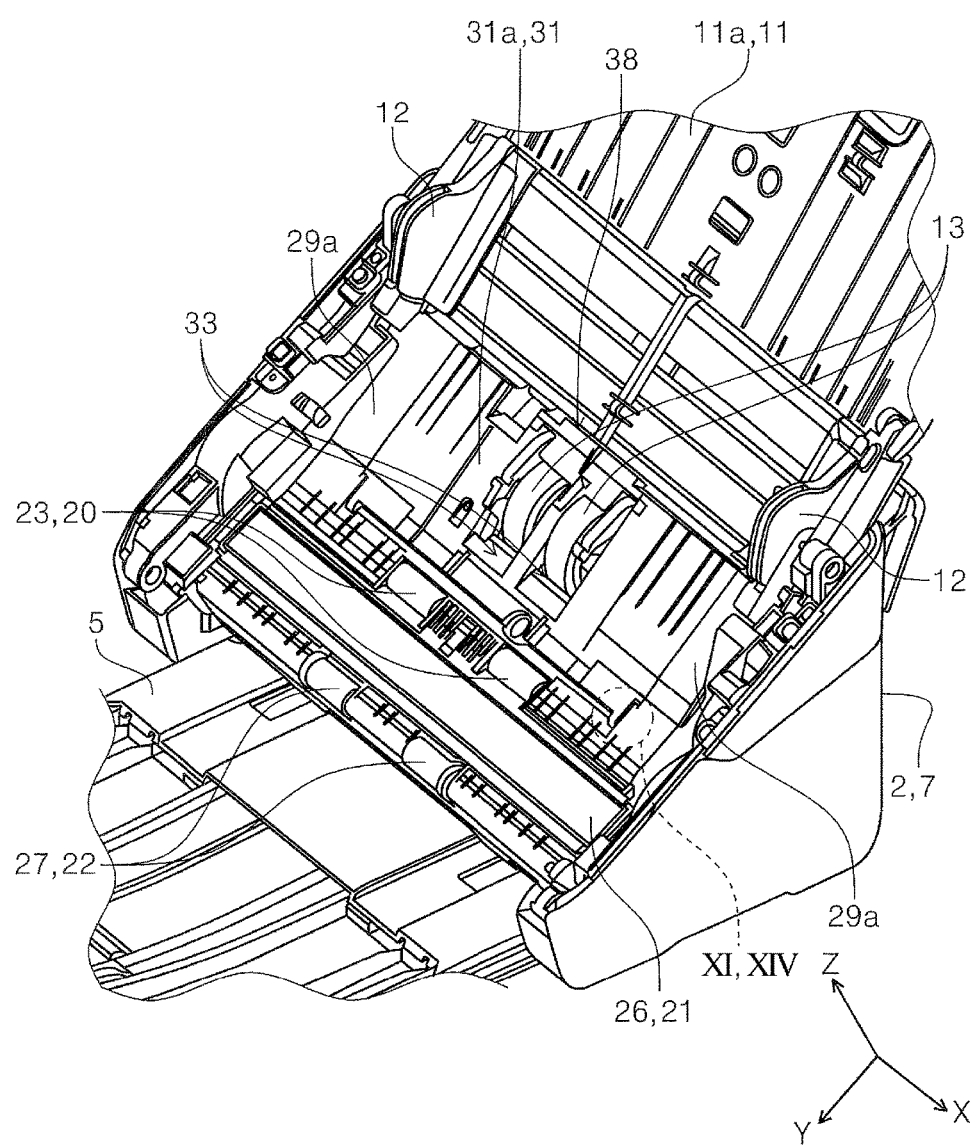
FIG. 7 is a perspective view illustrating a state in which the first cover member is attached to a lower portion unit and is in a first position.
Figure 8:
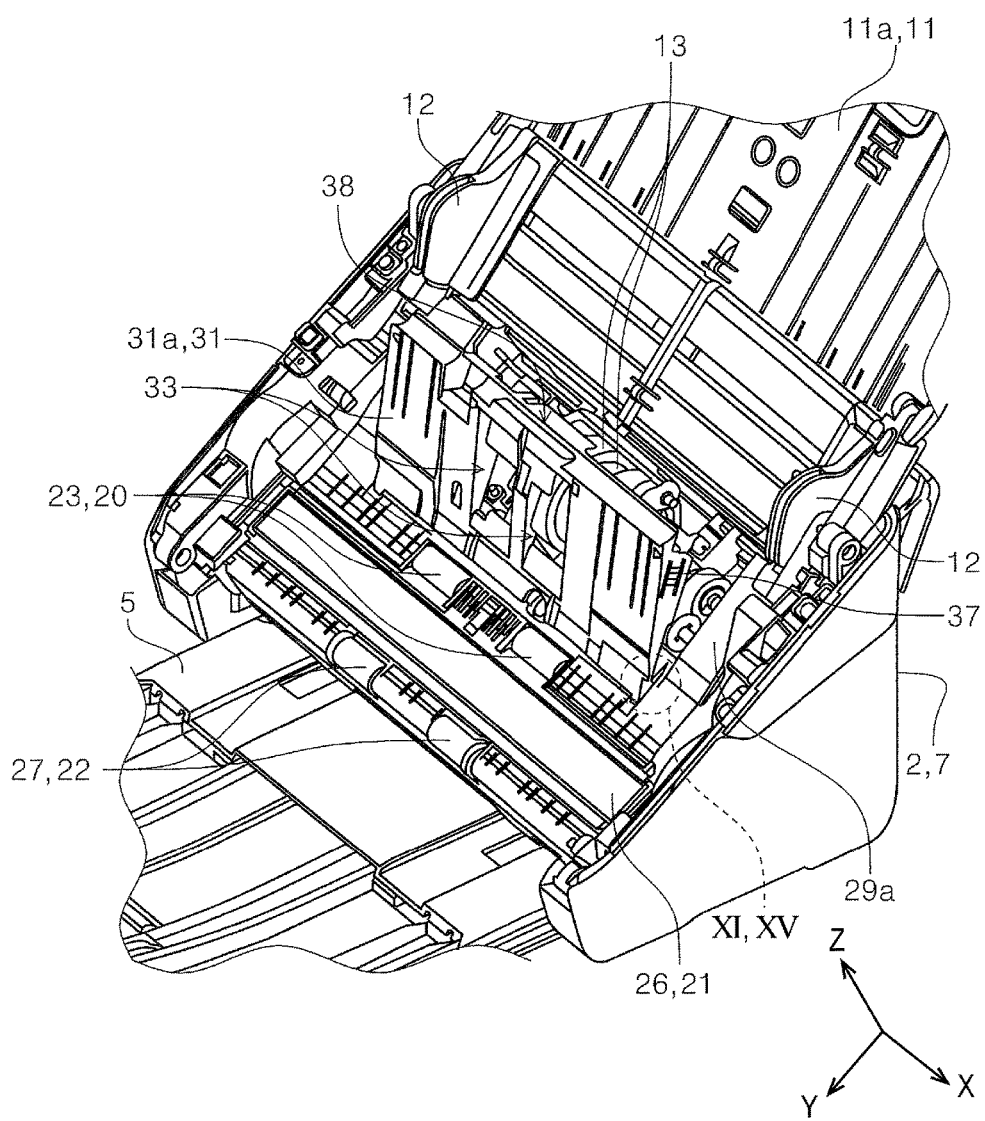
FIG. 8 is a perspective view illustrating a state in which the first cover member has rotated from the first position illustrated in FIG. 7 to be in a second position.
Figure 9:
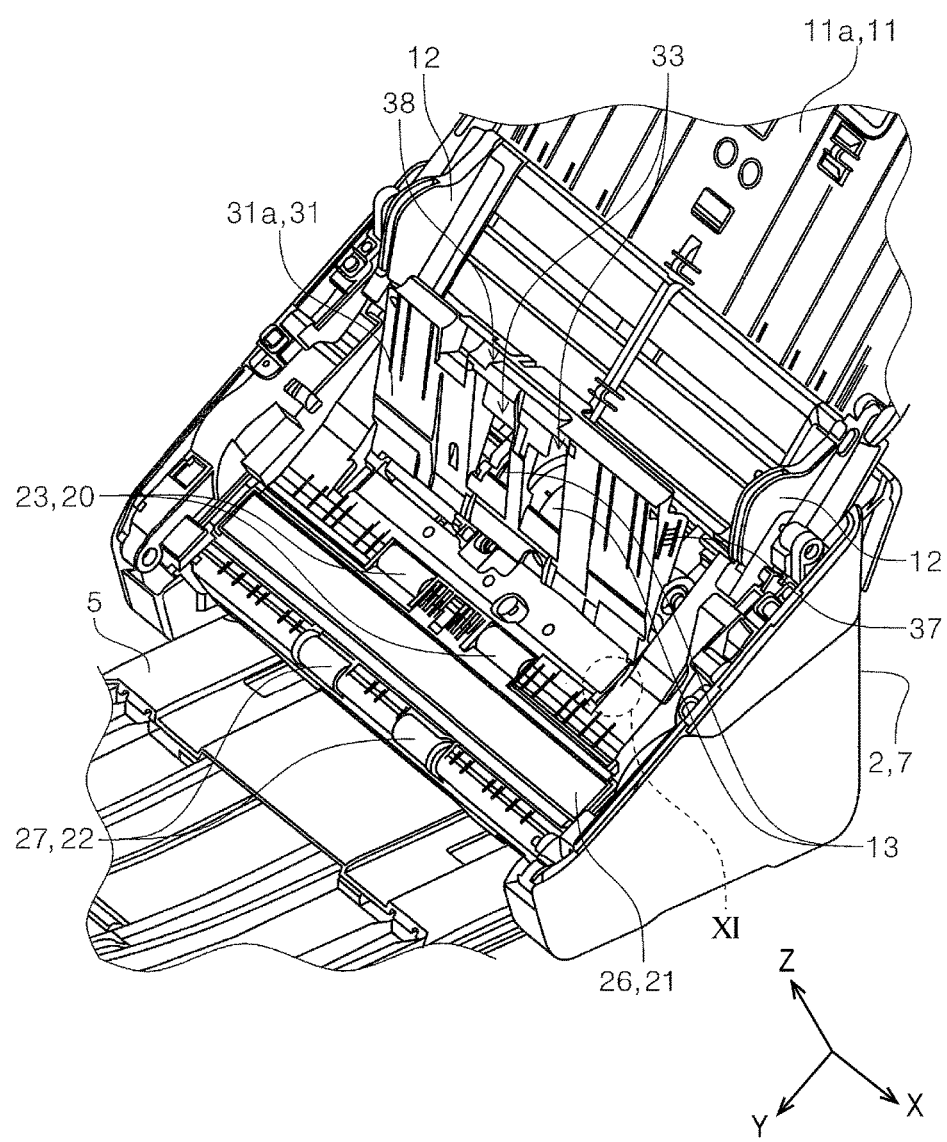
FIG. 9 is a perspective view illustrating a state in which the first cover member has been pulled out toward an upstream side from the state of FIG. 8.
Figure 10:
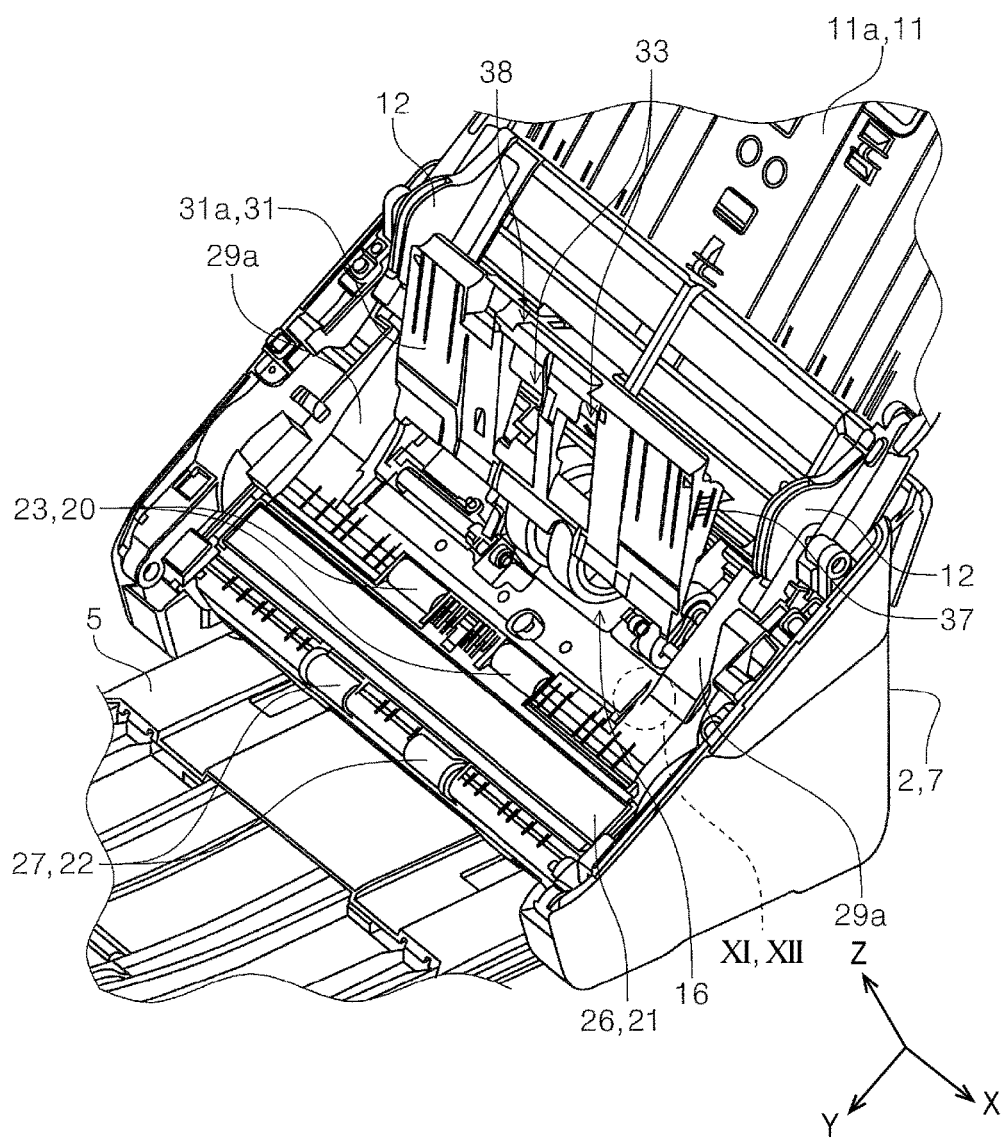
FIG. 10 is a perspective view illustrating a state in which the first cover member has been pulled out further toward the upstream side than the state in FIG. 9.
Figure 11:
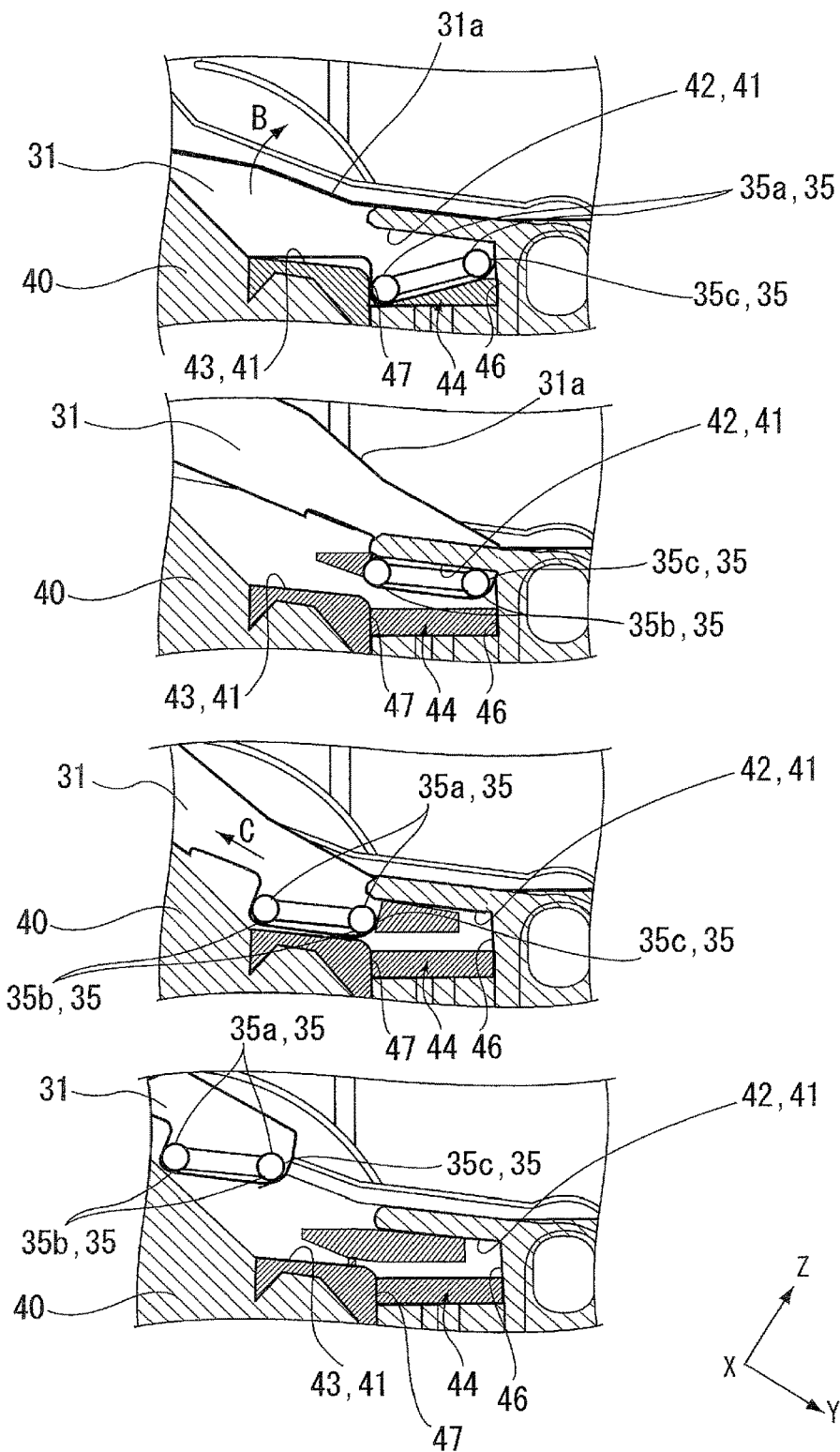
FIG. 11 is a view for explaining a removing operation of the first cover member.
Figure 12:
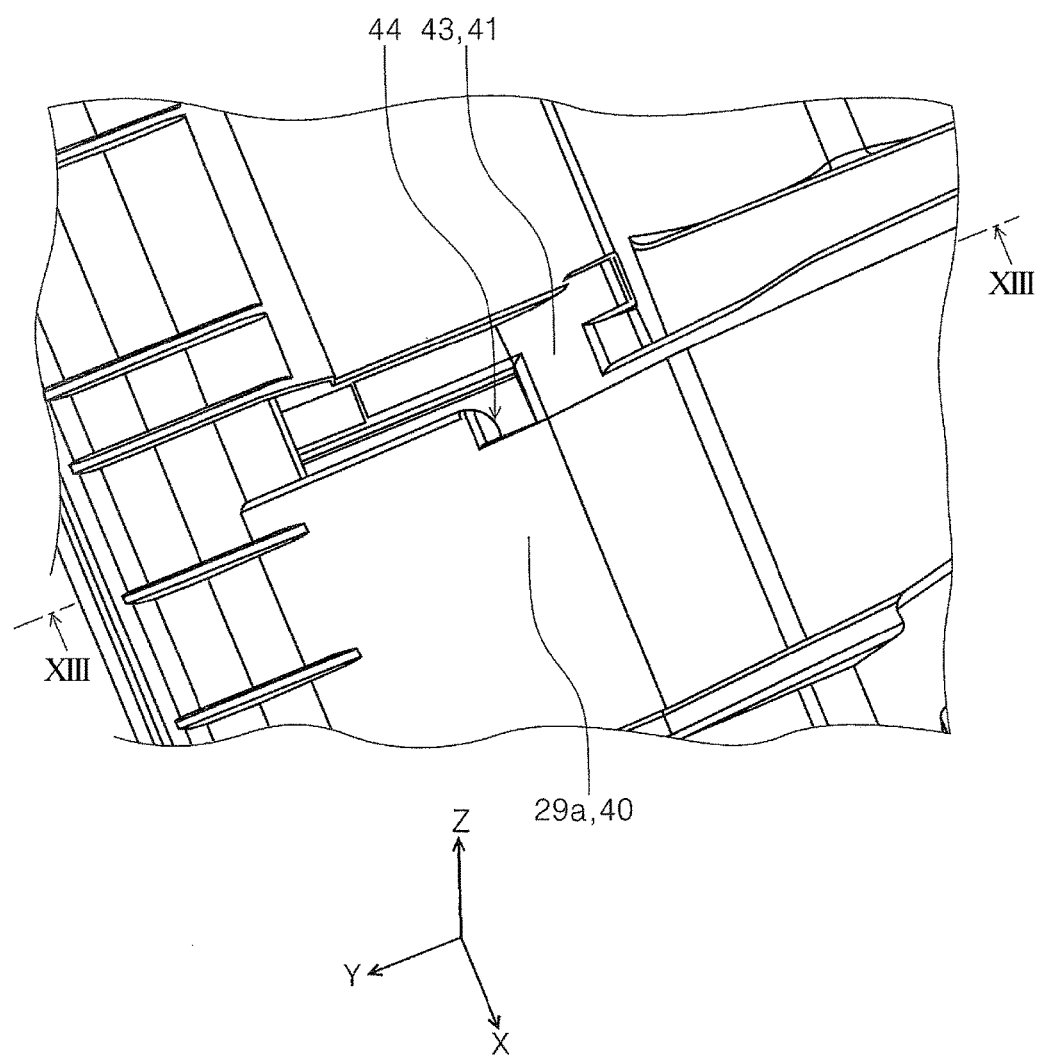
FIG. 12 is an enlarged view illustrating a portion indicated by reference numeral XII in FIG. 10.
Figure 13:
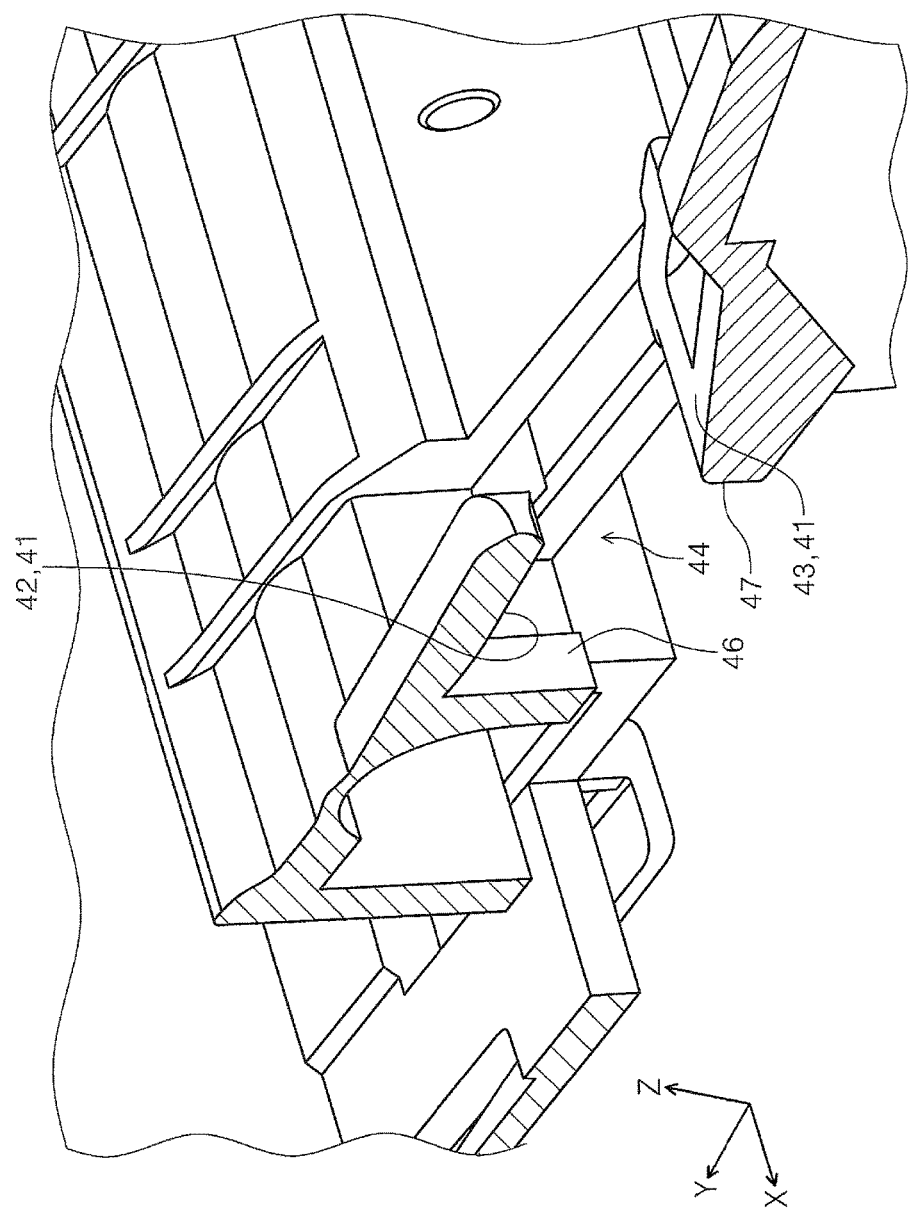
FIG. 13 is a cross-sectional view taken along line XIII-XIII of FIG. 12.
Figure 14:
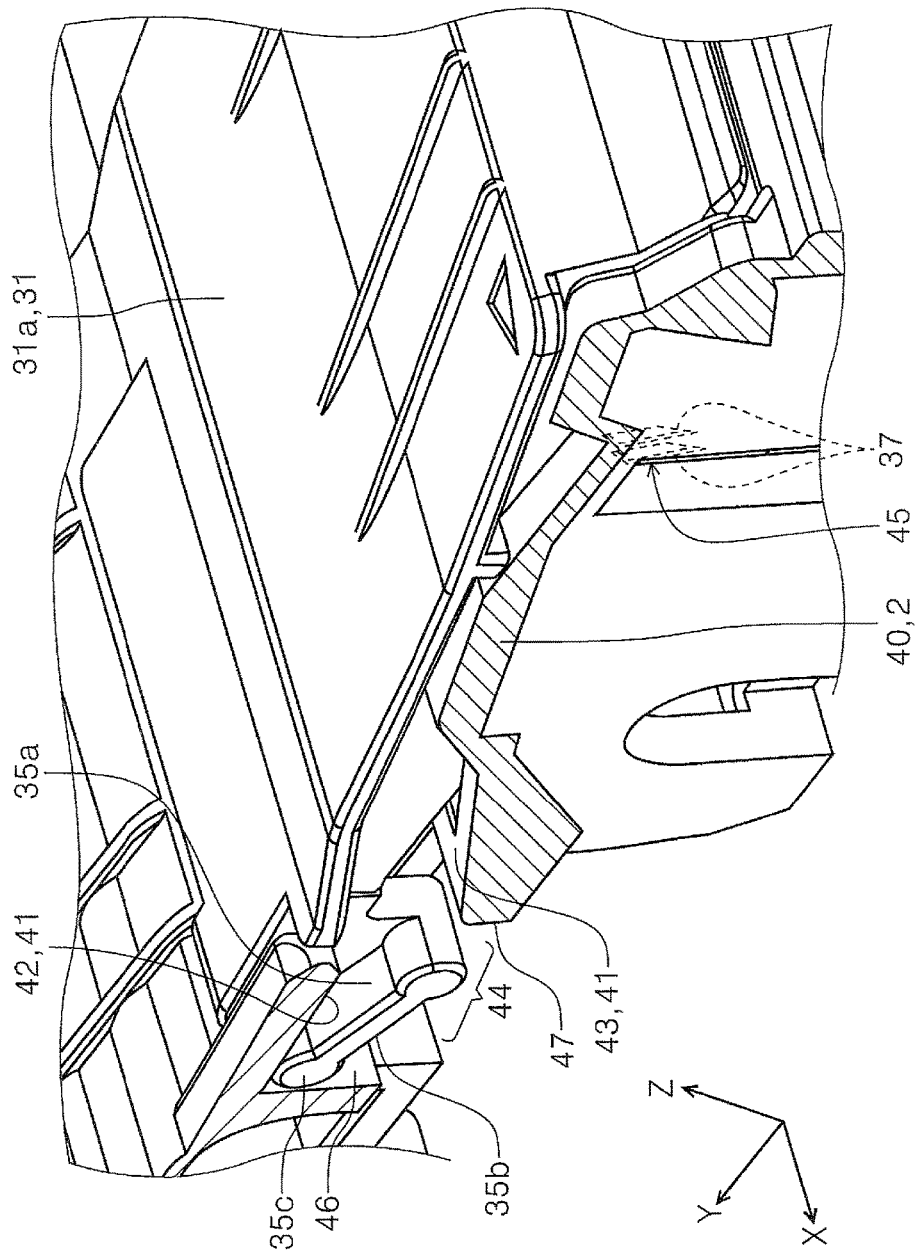
FIG. 14 is an enlarged perspective cross-sectional view illustrating a portion indicated by reference numeral XIV in FIG. 7.
Figure 15:
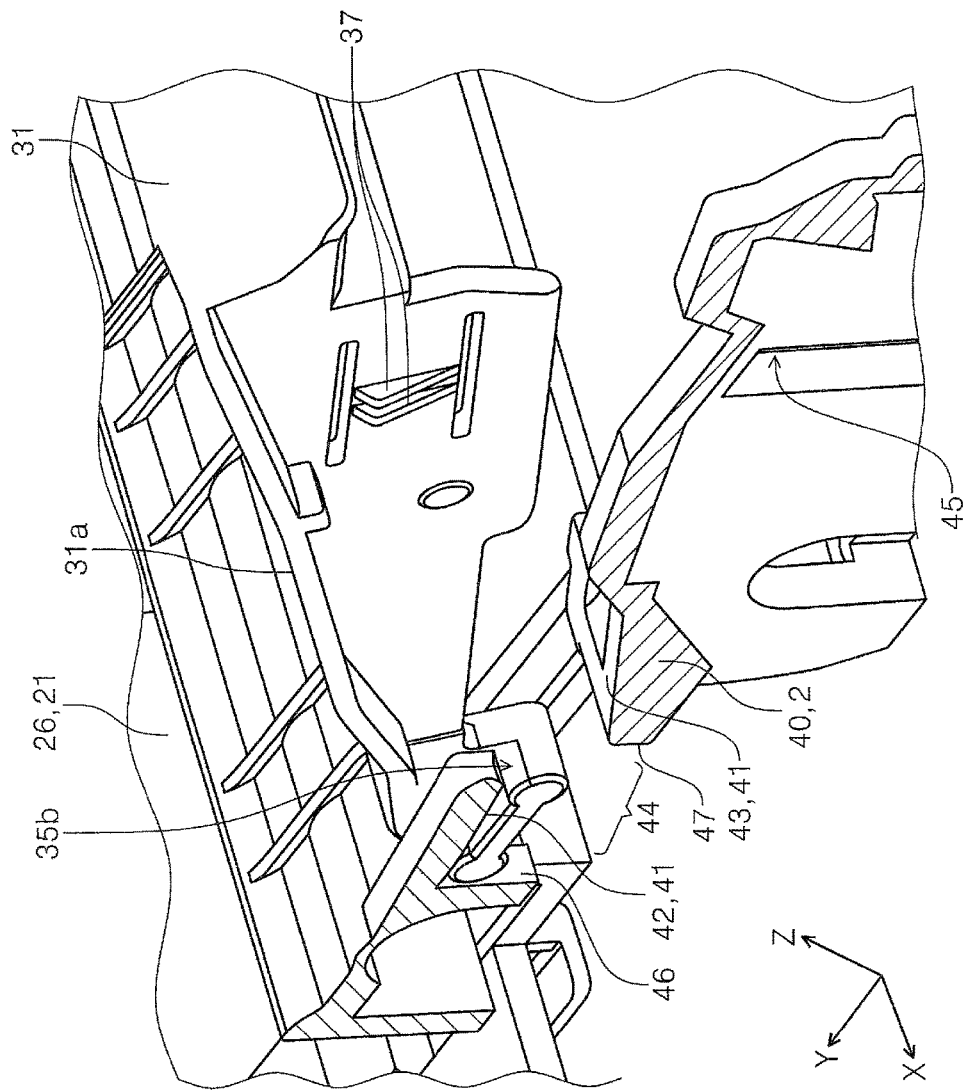
FIG. 15 is an enlarged perspective cross-sectional view illustrating a portion indicated by reference numeral XV in FIG. 8.
Figure 16:
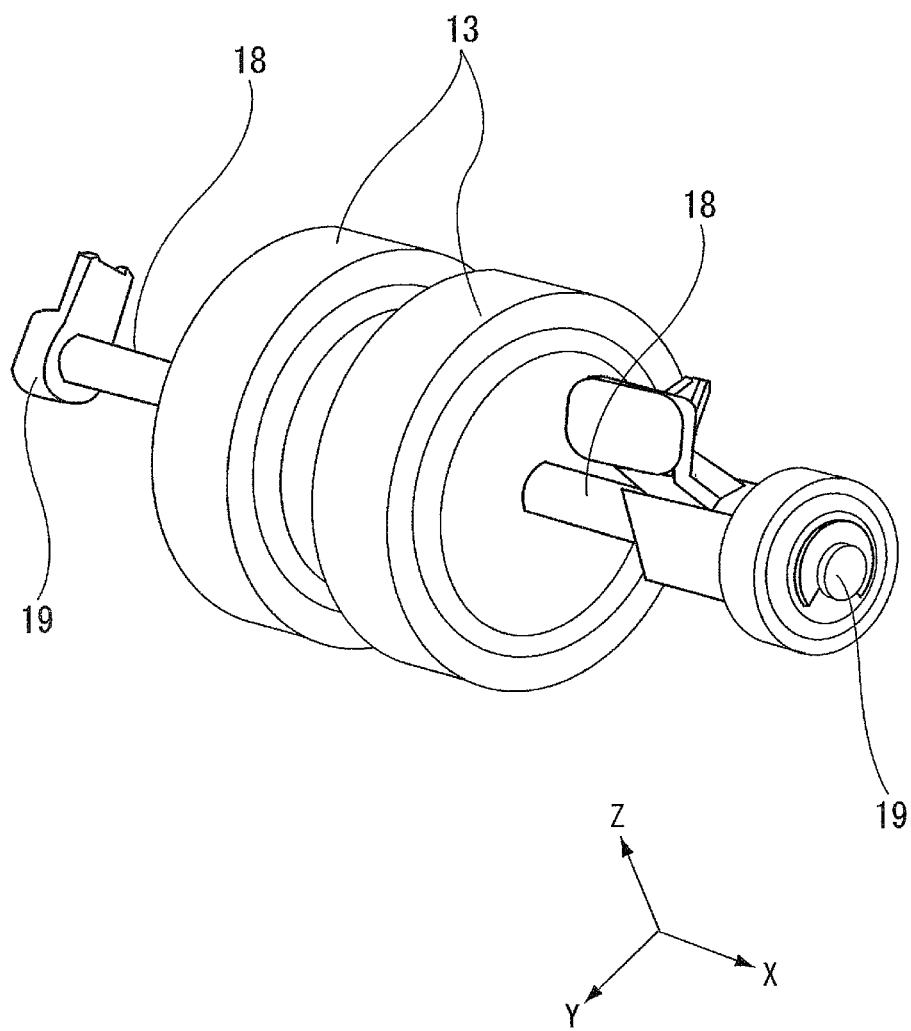
FIG. 16 is a perspective view illustrating a feeding roller.
Figure 17:
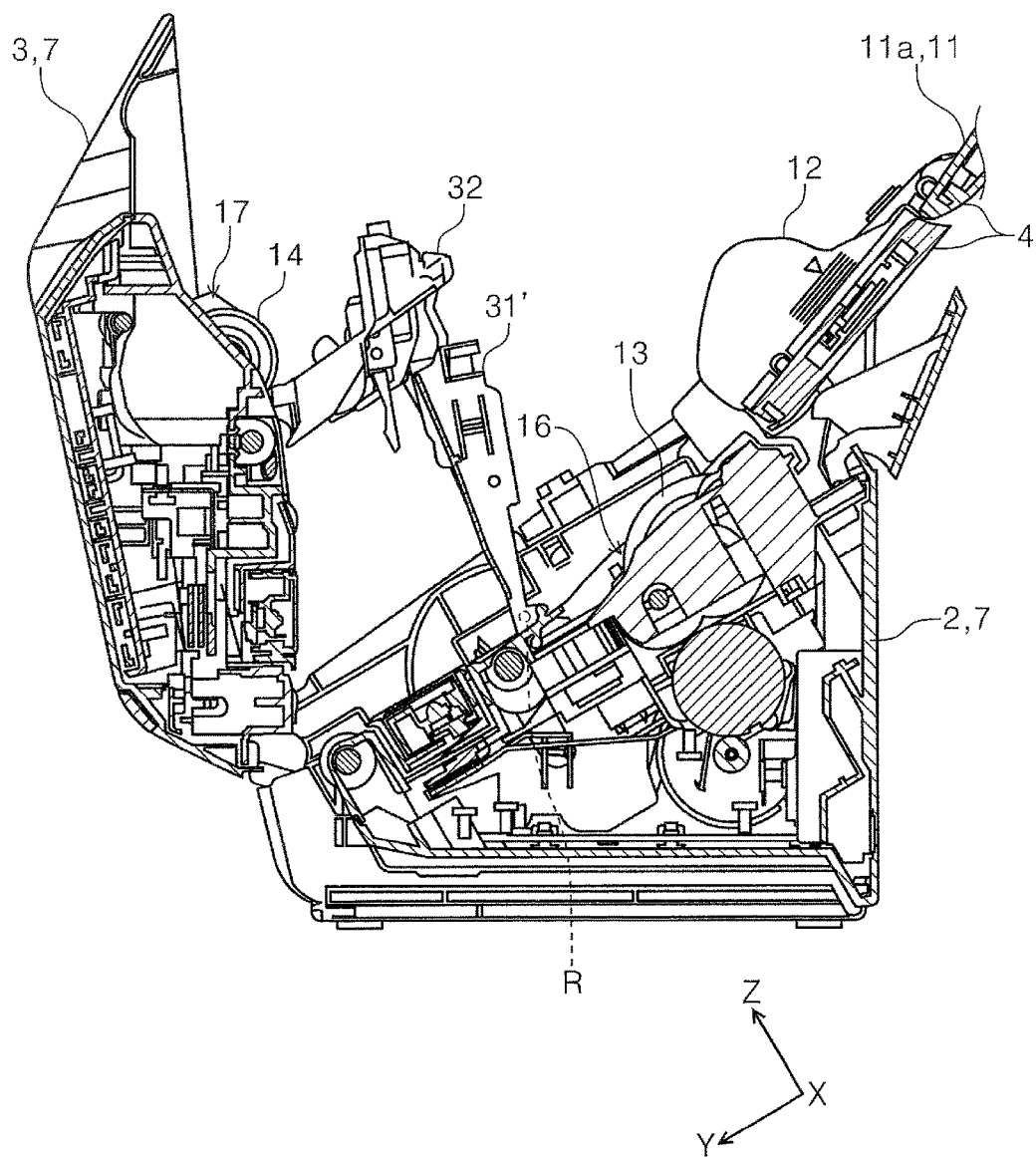
FIG. 17 is a perspective view illustrating the related art in which a cover member of the feeding roller rotates with respect to a lower portion unit to be opened and closed.

FIG. 7 is a perspective view illustrating a state in which the first cover member is attached to a lower portion unit and is in a first position. FIG. 8 is a perspective view illustrating a state in which the first cover member has been rotated from the first position illustrated in FIG. 7 to a second position. FIG. 9 is a perspective view illustrating a state in which the first cover member has been pulled out toward an upstream side from the state of FIG. 8. FIG. 10 is a perspective view illustrating a state in which the first cover member has been pulled out further toward the upstream side than the state in FIG. 9. FIG. 11 is a view for explaining an operation of removing the first cover member. FIG. 12 is an enlarged view illustrating a portion indicated by reference numeral XII in FIG. 10. FIG. 13 is a cross-sectional view taken along line XIII-XIII of FIG. 12. FIG. 14 is an enlarged perspective cross-sectional view illustrating a portion indicated by reference numeral XIV in FIG. 7. FIG. 15 is an enlarged perspective cross-sectional view illustrating a portion indicated by reference numeral XV in FIG. 8. FIG. 16 is a perspective view illustrating a feeding roller. FIG. 17 is a perspective view illustrating the related art in which a cover member of the feeding roller rotates with respect to a lower portion unit to be opened and closed.

Overview of Scanner

A scanner 1 (FIG. 1) as the image reading apparatus according to the invention includes a medium feeding device 10 (FIG. 3) for feeding a paper P as a "medium".

The outer appearance of the scanner 1 is configured by a housing 7 which includes a lower portion unit 2 and an upper portion unit 3 and an opening/closing body 4 which opens and closes an upper surface of the upper portion unit 3 and a feeding port 6 (FIG. 2) to be described below.

In an X-Y-Z coordinate system used in each drawing, an X direction is a paper width direction which is an apparatus width direction and a Y direction is a paper transport direction. The Z direction indicates a direction perpendicular to a surface of paper which is substantially transported since the Z direction is a direction intersecting the Y direction. In addition, a +Y direction side is a front side of the apparatus and a −Y direction side is a rear side of the apparatus. In addition, a right side which is viewed from the front side of the apparatus is defined as a +X direction and the left side is a −X direction. In addition, a +Z direction is an upper side (including an upper portion, an upper surface, and the like) of the apparatus, and a −Z direction side thereof is a lower side (including a lower portion, a lower surface, and the like) of the apparatus.

In addition, in the scanner 1, the paper P as the medium is configured to be transported in the +Y direction of each drawing. The +Y direction side is "downstream" and the −Y direction side is "upstream".

The upper portion unit 3 is connected to the lower portion unit 2 to be openable and closable about the downstream side of the lower portion unit 2, as a rotating point, in the transport direction of the paper P. Specifically, the upper portion unit 3 is attached to the downstream side of the lower portion unit 2 so as to be rotatable about a hinge portion 9 (FIG. 4) as the rotating point.

In a case where the upper portion unit 3 is closed with respect to the lower portion unit 2, the upper portion unit 3 takes a closed state (FIG. 2) in which a transport path 30 of the paper P is formed by the upper surface (lower side guiding portion 29a to be described below) of the lower portion unit 2 and the lower surface (upper side guiding portion 29b to be described below) of the upper portion unit 3 and an open state (FIG. 4) in which, by exposing the transport path 30 of the paper p through rotation of the upper portion unit in the apparatus front surface side with respect to the lower portion unit 2, clearance of paper jams, maintenance of a feeding roller 13 and a separating roller 14 to be described below, or the like is easily performed.

In addition, the opening/closing body 4 which opens and closes the upper portion of the upper portion unit 3 is attached to the lower portion unit 2 so as to be rotatable with respect to the upper portion on the rear surface side of the lower portion unit 2, and functions, in the open state, as a medium mounting member 11 on which the paper P is mounted (FIG. 2). In FIG. 2, reference numeral 15 denotes an auxiliary paper support 15 which can be stored in and pulled out from the opening/closing body 4 formed in a hollow shape.

As illustrated in FIG. 1, the opening and closing body 4 as the medium mounting member 11 takes a non-feeding state in which the upper portion of the upper portion unit 3 and a feeding port 6 are covered (FIG. 2), and a feeding state in which the opening/closing body 4 has been rotated from the non-feeding state in FIG. 1 to the rear surface side of the apparatus as in FIG. 2 thereby causing the feeding port 6 to become open and the opening/closing body 4 becomes the medium mounting member 11 which supports the fed paper P on an inside surface (mounting surface 11a) of the opening/closing body 4.

A pair of edge guides 12 and 12 (FIG. 2) which guide both side edges of the paper P in the width direction (X axis direction) of the paper P are provided on the medium mounting member 11. The edge guides 12 and 12 are provided so as to be slidable in the X axis direction in accordance with the size of the paper P. In the example, the edge guides 12 and 12 are configured so that one edge guide 12 (for example, +X side) is movable in either the positive or negative X direction and the other edge guide 12 (−X side) moves in the opposite direction.

In other words, the scanner 1 is configured so that the paper P is aligned in the center in the width direction in the medium mounting member 11, and thus is fed by a so-called center paper feeding method.

Regarding Paper Transport Path in Scanner

Next, with reference to mainly FIG. 3, a paper transport path in the scanner 1 will be described. A dotted line indicated by a reference numeral P1 in FIG. 3 indicates a transport path of the paper P.

The distal end side (downstream side) of the paper P which is set in the feeding port 6 is supported and mounted on a mounting surface 11a of the medium mounting member 11 (opening and closing body 4 in open state).

A plurality of sheets of paper P can be set in the feeding port 6. The paper P set in the feeding port 6 is fed by the medium feeding device 10 and sent toward an image reading portion 21 to be described below. The medium feeding device 10 of the present embodiment includes the feeding roller 13 and the separating roller 14 that nips and separates the paper P between the feeding roller 13 and the separating roller 14.

As illustrated in FIG. 4, the feeding roller 13 is disposed at two positions with a space therebetween which is empty in the width direction (X axis direction) intersecting the transport direction of the paper P and thus the feeding rollers 13 are provided to be symmetrical with respect to a center portion in the width direction. The separating roller 14 is provided at two positions facing the feeding rollers 13.

Each of the feeding rollers 13 is rotatably provided with respect to the lower portion unit 2. In addition, the feeding roller 13 is detachably provided to the lower portion unit 2 in a feeding roller holding portion 16 (FIG. 3 and FIG. 10) which is formed as a concave portion in the lower portion unit 2 and thus is designed to be removable for maintenance.

The feeding roller holding portion 16 is covered by the first cover member 31. A first cover member 31 is designed to be configured to have a cover surface 31a constituting a portion of the lower side guiding portion 29a as an "upper surface" of the lower portion unit 2 and to cover the holding portion of the feeding roller 13 while exposing a portion of the feeding roller 13 to the transport path 30.

Similarly, the separating roller 14 is also provided to be rotatable and detachable with respect to a separating roller holding portion 17 (FIG. 3 and FIG. 5) which is formed on the upper portion unit 3 as a concave portion, and thus is covered by a second cover member 32 which includes a cover surface 32a constituting a portion of the upper side guiding portion 29b as a "lower surface of the upper portion unit 3.

The first cover member 31 and the second cover member 32 will be described below in detail.

The paper P which is mounted on the medium mounting member 11 is picked up by the feeding roller 13 and thus is fed toward the downstream side (+Y direction side). Specifically, the paper P is fed toward the downstream side by the feeding roller 13 being in contact with and rotating about a surface facing the mounting surface 11a of the paper P. Therefore, in a case where a plurality of sheets of paper P are set in the feeding port 6 in the scanner 1, the sheets of paper P are transported along the transport path 30 toward the downstream side in order from the sheet of paper P on the side of the mounting surface 11a of the medium mounting member 11.

A transport roller 20 is provided on the downstream side of the feeding roller 13. Similarly to the feeding roller 13, the transport roller 20 is disposed at two positions with a space therebetween which is empty in the width direction (X axis direction) intersecting the transport direction of the paper P and thus the transport rollers 20 are provided as two rollers 20a and 20b in order to be symmetrical to the center portion in the width direction (see also FIG. 4).

Each of the transport roller 20 is configured to include a transport driving roller 23 provided in the lower portion unit 2 and a transport driven roller 24 which is provided in the upper portion unit 3 and thus is driven to rotate with respect to the transport driving roller 23.

Similarly to the feeding roller 13, the transport driving roller 23 is disposed such that a portion thereof is exposed to the transport path 30 with respect to the lower side guiding portion 29a.

On the downstream side of the transport roller 20, the image reading portion 21 as a "reading portion" for reading an image is provided and thus the paper P is transported to the image reading portion 21 by the transport roller 20.

The image reading portion 21 includes an upper portion image reading sensor 25 which is provided on the upper portion unit 3 side and a lower portion image reading sensor 26 which is provided on the lower portion unit 2 side. In the example, the upper portion image reading sensor 25 and the lower portion image reading sensor 26 are configured as a contact type of image sensor module (CISM) as an example.

The paper P is transported by a discharge roller 22 which is positioned on the downstream side of the image reading portion 21 after the image of at least one of a front surface and a rear surface of the paper P has been read in the image reading portion 21, and thus the paper P is discharged from a discharge port 8 which is provided on the apparatus front surface side of the lower portion unit 2.

The lower portion unit 2 includes a paper discharge tray 5 which is configured to be capable of being pulled out from the discharge port 8 toward the apparatus front surface side. The paper discharge tray 5 can take a state (FIG. 1) in which it is accommodated in the bottom portion of the lower portion unit 2 and a state (FIG. 2) in which it is pulled out toward the apparatus front surface side. In a state in which the paper discharge tray 5 is pulled out, the paper P that is discharged from the discharge port 8 is stacked on the paper discharge tray 5.

In addition, in the embodiment, the discharge roller 22 includes a discharge driving roller 27 which is provided in the lower portion unit 2 and a discharge driven roller 28 which is provided in the upper portion unit 3 and is driven to rotate with respect to the discharge driving roller 27.

In the embodiment, the feeding roller 13, the transport driving roller 23, and the discharge driving roller 27 are rotationally driven by at least one drive source (not illustrated) provided in the lower portion unit 2.

Regarding Feeding Roller 13 and First Cover Member

Next, the feeding roller 13 constituting the medium feeding device 10 described above and the first cover member 31 covering the holding portion of the feeding roller 13 (feeding roller holding portion 16) will be described in more detail.

As illustrated in FIG. 16, the feeding roller 13 is axially supported on a rotational shaft 18, and an end portion 19 of the rotational shaft 18 is attached to an attaching portion (not illustrated) provided in the feeding roller holding portion 16. Cleaning or replacement of the feeding roller 13 is performed by attaching the feeding roller 13 to and detaching the feeding roller 13 from the feeding roller holding portion 16 of the lower portion unit 2 in a state where the feeding roller 13 is axially supported by the rotating shaft 18.

In the example, the first cover member 31 which covers the feeding roller holding portion 16 is configured to be attachable to and detachable from an upper surface member 40 constituting the upper surface (lower side guiding portion 29a) of the lower portion unit 2, and is configured to be removable in a direction including a component directed toward the upstream side (−Y direction) in the transport direction. The attachment and detachment operation of the first cover member 31 will be described below in detail.

On the other hand, the second cover member 32 which covers the holding portion of the separating roller 14 (separating roller holding portion 17) is configured to be opened and closed by being rotatably attached to the downstream side in the transport direction of the paper P as a rotating point so as to be opened and closed. In FIG. 4, the second cover member 32 is in the closed state, and in FIG. 5, the second cover member 32 is in the opened state.

Similarly, the separating roller 14 is also detachably attached to the separating roller holding portion 17 while being axially supported by the rotational shaft.

Here, for example, as illustrated in FIG. 17, the cover member 31' which covers the feeding roller holding portion 16 is configured to be opened and closed by being rotatably attached to the rotating point R which is provided on the downstream side in the transport direction with respect to the lower portion unit 2 on which the feeding roller holding portion 16 is provided, similar to the second cover member 32 of the separating roller holding portion 17, since there is a need to ensure that both the second cover member 32 and the cover member 31' do not interfere with each other in the opened state, the opening angle between the second cover member 32 and the cover member 31' is limited to be small.

In addition, if the upper portion unit 3 is closed with the cover member 31' being in the opened state, since there is a risk of a hinge portion (rotating point R) of the cover member 31' being damaged, the opening angle of the cover member 31' is also limited to be small so that the opening angle thereof becomes an angle (for example, acute angle) in which the upper portion unit 3 is naturally closed even if the upper portion unit 3 is erroneously closed in a state in which the cover member 31' is opened.

If the opening angle of the cover member 31' is narrow, the space for performing maintenance such as replacement and cleaning of the feeding roller 13 becomes small, and thus workability deteriorates.

However, in the example, since the first cover member 31 which covers the feeding roller holding portion 16 is configured to be attachable to and detachable from the lower portion unit 2, in a case where maintenance such as replacement or cleaning of the feeding roller 13 is performed, the first cover member 31 is completely removed from the lower portion unit 2, and thus a large work space for maintenance can be obtained.

In addition, at the time of maintenance, the risk of other constituent members (the upper portion unit 3, the second cover member 32, or the like) being in contact with the first cover member 31 and scratching the cover surface 31a as a transport surface of the paper P can be avoided. Regarding attachment/detachment operation of first cover member Subsequently, the attachment/detachment operation of the first cover member 31 will be described. First, the operation of removing the first cover member 31 from the upper surface member 40 of the lower portion unit 2 will be described. Each of FIG. 7 to FIG. 10 and FIG. 11 illustrates the operation at the time of removing the first cover member 31 in order and FIG. 11 corresponds to the side cross section of portions which are indicated by the reference numeral XI in FIG. 7 to FIG. 10 in order from the top.

As described above, the first cover member 31 is configured to be removable in a direction including a component directed toward the upstream side in the transport direction (-Y direction). In other words, the first cover member 31 is removed by being pulled out toward the upstream side in the transport direction.

The first drawing from the top in FIG. 11 and FIG. 7 illustrates a state in which the first cover member 31 is attached to the upper surface member 40 of the lower portion unit 2. The position of the first cover member 31 in a state of being attached to the upper surface member 40 is referred to as a "first position". The first position is a position in which the cover surface 31a of the first cover member 31 is attached to the lower portion unit 2 so as to constitute the lower side guiding portion 29a which is the upper surface of the upper surface member 40 (lower portion unit 2).

The first cover member 31 includes a slide portion 35 (FIG. 6) at a downstream end portion thereof. The slide portion 35 is a portion that is guided by a slide surface 41 to be described below.

In the first position in the attached state, the slide portion 35 is accommodated in a positioning portion 44 (FIG. 12 to FIG. 14) which is provided on the upper surface member 40.

In other words, the upper surface member 40 of the lower portion unit 2 includes the positioning portion 44 for receiving the slide portion 35 and determining the attachment position of the first cover member 31 in a case where the first cover member 31 is in the first position.

The positioning portion 44 (FIG. 13 and FIG. 14) includes a downstream side regulating portion 46 and an upstream side regulating portion 47 which regulate the movement of the slide portion 35 in the Y axis direction.

When the first cover member 31 is in the first position in which the first cover member 31 is attached to the lower portion unit 2, the attachment position of the first cover member 31 is determined by a simple configuration and in a reliable manner by the slide portion 35 being accommodated in the positioning portion 44.

In addition, the lower portion unit 2 includes the slide surface 41 which is formed on an inclined surface rising from the downstream side to the upstream side in the transport direction. The first cover member 31 is configured so that the slide portion 35 which is provided on a downstream side end portion of the first cover member 31 is guided by the slide surface 41 so as to be attached and detached.

In the example, the slide surface 41 includes a first slide surface 42 which guides the upper portion 35a (FIG. 11) of the slide portion 35 and a second slide surface 43 which is provided on the upstream side of the first slide surface 42 and guides the lower portion 35b of the slide portion 35 (FIG. 11 and FIG. 13).

When the first cover member 31 is removed from the upper surface member 40, a gripping portion 38 (FIG. 6) provided on the upstream side end portion is lifted by the user, and as illustrated in the second drawing from the top in FIG. 11 and FIG. 8, the distal end 35c (downstream side end portion) of the slide portion 35 is rotated as a shaft, the cover surface 31a becomes a steep inclined surface that is steeper than the first position in the medium transport direction, the upper portion 35a of the slide portion 35 is guided by the first slide surface 42 and thus the first cover member 31 is changed from the first position (first drawing from top in FIG. 11) to the second position (second drawing from top in FIG. 11) in which the first cover member 31 becomes attachable to and detachable from the upper surface member 40.

In the first drawing from the top in FIG. 11, an arrow B indicates a rotating direction of the first cover member 31.

The first cover member 31 in the second position can be pulled out in a direction (the direction of an arrow C in the third drawing from the top in FIG. 11) including a component directed in the upstream side in the transport direction (-Y direction). In a state illustrated in the third drawing from the top in FIG. 11 and in FIG. 9, the lower portion 35b of the slide portion 35 is guided by the second slide surface 43.

As illustrated in the fourth drawing from the top in FIG. 11, when the first cover member 31 is pulled out until the distal end 35c of the slide portion 35 is positioned on the upstream side of the first slide surface 42, the first cover member 31 can be removed from the upper surface member 40 away from the slide surface 41 (see also FIG. 10).

As described above, the slide portion 35 which is provided on the downstream side end portion of the first cover member 31 is guided by the slide surface 41 (first slide surface 42 and second slide surface 43) which is provided in the upper surface member 40 (lower portion unit 2), the first cover member 31 is detached, and thus the user can easily attach to and detach from the first cover member 31.

In addition, in a case where the first cover member 31 is removed from the upper surface member 40 of the lower portion unit 2, since the cover surface 31a rotates from the first position in which the first cover member 31 is attached the second position in which the cover surface 31a is in an inclined surface which is steeper than the first position, the slide portion 35 is guided by the slide surface 41 (first slide surface 42 and second slide surface 43) in the second position, and thus the slide portion 35 can be removed, the user can perform attachment and detachment of the first cover member 31 by a natural operation such as at the time of opening and closing of the cover member 31' (see FIG. 17) having the rotating point in the downstream side.

The attachment of the first cover member 31 to the upper surface member 40 can be performed by performing an operation which is reverse to at the time of removal.

In a case where the first cover member 31 is removed, since the first cover member 31 is configured to be removable in a direction including a component directed toward the upstream side in the transport direction, the risk of the hand of the person performing the maintenance being in contact with a constituent member (for example, reading surface of image reading portion 21) which is positioned on the downstream side of the feeding roller 13, the upper portion unit 3 or the second cover member 32 in the open state can be prevented. Therefore, the risk of breakage or scratching of these portions can be avoided. Another configuration of first cover member As illustrated in FIG. 14, the first cover member 31 includes an engaging portion 37 on the side surface of the first cover member 31. When the first cover member 31 is attached to the lower portion unit 2, the engaging portion 37 is engaged to an engaged portion 45 which is provided in the lower portion unit 2, and thus the first cover member 31 which is attached to the lower portion unit 2 can be difficult to be pulled out.

Although the side surface of the +X side is illustrated in FIG. 14, the engaging portion 37 in the example is also provided on the side surface of the −X side. In this way, in addition to the case where the engaging portions 37 and 37 are provided on both sides in the width direction of the first cover member 31, for example, the engaging portion can be provided on one portion of the central portion of the upstream side end portion of the first cover member 31 in the width direction. Of course, the engaging portion may be provided in other portion.

In addition, the gripping portion 38 which is put on a hand at the time of attachment and detachment of the first cover member 31 is provided at the upstream side end portion of the first cover member 31 in the transport direction of the paper P. By providing the gripping portion 38, the attachment and detachment operation of the first cover member 31 can be easily performed.

Besides, the invention is not limited to the above described example, and various modifications are possible within the scope of the invention described in the claims, and thus the various modifications are naturally included within the scope of the invention.

The entire disclosure of Japanese Patent Application No. 2016-057051, filed Mar. 22, 2016 is expressly incorporated by reference herein.

What is claimed is:

1. A medium feeding device, comprising:
a lower portion unit in which a feeding roller for feeding a medium is provided, and
an upper portion unit in which a separating roller for nipping and separating the medium between the feeding roller and the separating roller is provided,
wherein the upper portion unit is connected to the lower portion unit so as to be openable and closable, in the closed state of the upper portion unit, a transport path of the medium is formed by a lower surface of the upper portion unit and an upper surface of the lower portion unit,
wherein the lower portion unit has a cover member which covers a holding portion of the feeding roller while exposing a portion of the feeding roller to the transport path,
wherein the cover member is configured to be removable in a direction directed toward an upstream side in the transport direction by being attachable to and detachable from the lower portion unit, and
wherein the cover member includes an engaging portion which is engaged to an engaged portion which is provided on the lower portion in a state in which the cover member is attached.

2. The medium feeding device according to claim 1, wherein the lower portion unit includes a slide surface which is formed on an inclined surface which rises from the downstream side to the upstream side in the transport direction of the medium, and
wherein the cover member is attached and detached by a slide portion which is provided on a downstream side end portion of the cover member being guided by the slide surface.

3. The medium feeding device according to claim 2, further comprising:
a cover surface constituting a portion of the upper surface of the lower portion unit,
wherein the cover member rotates about the downstream side end portion as a shaft, and
wherein the cover member is in a first position in which the cover surface forms the upper surface of the lower portion unit and thus is attached to the lower portion unit and a second position in which the cover surface is rotated from the first position, and the slide portion is guided by the slide surface and thus the cover member is attachable to and detachable from the lower portion unit.

4. The medium feeding device according to claim 3, wherein the lower portion unit includes a positioning portion which receives the slide portion and which determines an attachment position of the cover member, in a case where the cover member is in the first position.

5. The medium feeding device according to claim 1, wherein the cover member includes a gripping portion for attaching and detaching the cover member in an upstream side end portion in the transport direction of the medium.

6. An image reading apparatus, comprising:
a reading portion which reads a medium; and the medium feeding device according to claim 1 which feeds the medium toward the reading portion.

7. A medium feeding device, comprising:

a lower portion unit in which a feeding roller for feeding a medium is provided, and an upper portion unit in which a separating roller for nipping and separating the medium between the feeding roller and the separating roller is provided, wherein the upper portion unit is connected to the lower portion unit so as to be openable and closable, in the closed state of the upper portion unit, a transport path of the medium is formed by a lower surface of the upper portion unit and an upper surface of the lower portion unit, wherein the lower portion unit has a cover member which covers a holding portion of the feeding roller while exposing a portion of the feeding roller to the transport path, wherein the cover member is configured to be removable in a direction directed toward an upstream side in the transport direction by being attachable to and detachable from the lower portion unit, and wherein the feeding roller is detachable from the lower portion unit after the cover member is detachable from the lower portion unit in a state in which the upper portion unit is open.

* * * * *